United States Patent
Riley et al.

(10) Patent No.: US 9,744,873 B2
(45) Date of Patent: Aug. 29, 2017

(54) METHOD AND CONTROL DEVICE FOR CHARGING A BATTERY OF A VEHICLE

(75) Inventors: Jessica Riley, Mountain View, CA (US); Jaime Camhi, Sunnyvale, CA (US); Mario Tippelhofer, San Mateo, CA (US); Karric Kwong, Emeryville, CA (US)

(73) Assignees: VOLKSWAGEN AG, Wolfsburg (DE); AUDI AG, Ingolstadt (DE)

(*) Notice: Subject to any disclaimer, the term of this patent is extended or adjusted under 35 U.S.C. 154(b) by 0 days.

(21) Appl. No.: 13/547,332

(22) Filed: Jul. 12, 2012

(65) Prior Publication Data

US 2013/0096751 A1    Apr. 18, 2013

Related U.S. Application Data

(60) Provisional application No. 61/546,195, filed on Oct. 12, 2011.

(51) Int. Cl.
- *B60L 11/00* (2006.01)
- *B60L 11/18* (2006.01)
- *B60L 3/12* (2006.01)

(52) U.S. Cl.
CPC .............. *B60L 11/1861* (2013.01); *B60L 3/12* (2013.01); *B60L 11/184* (2013.01); *B60L 11/1844* (2013.01); *B60L 11/1846* (2013.01); *B60L 2240/622* (2013.01); *B60L 2240/68* (2013.01); *B60L 2240/72* (2013.01); *B60L 2250/12* (2013.01); *B60L 2250/16* (2013.01); *B60L 2250/18* (2013.01); *B60L 2250/20* (2013.01); *B60L 2260/52* (2013.01); *B60L 2260/54* (2013.01); *Y02E 60/721* (2013.01); *Y02T 10/7005* (2013.01); *Y02T 10/705* (2013.01); *Y02T 10/7044* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01);
(Continued)

(58) Field of Classification Search
CPC ...... B60W 20/00; B60W 10/08; B60W 10/06; Y02T 10/6286; B60K 6/445
USPC .......... 701/22, 123, 29.1, 36, 408, 439, 537; 703/18; 705/17, 26.1; 320/101, 106, 109
See application file for complete search history.

(56) References Cited

U.S. PATENT DOCUMENTS

| 5,642,270 A | 6/1997 | Green et al. |
| 5,815,824 A | 9/1998 | Saga et al. |

(Continued)

FOREIGN PATENT DOCUMENTS

| AU | 2008302073 | 3/2009 |
| AU | 2009293389 | 3/2010 |

(Continued)

OTHER PUBLICATIONS

International Search Report, dated Mar. 12, 2013, issued in corresponding International Application No. PCT/EP2012/003442.

*Primary Examiner* — Jelani Smith
(74) *Attorney, Agent, or Firm* — Andrews Kurth Kenyon LLP

(57) ABSTRACT

A method for charging a battery of a vehicle including at least one electric power train, the battery adapted to supply electrical energy to the electric power train, includes: predicting a charging location for charging the battery after at least one next trip of the vehicle; and transmitting the charging location to a power grid.

20 Claims, 3 Drawing Sheets

(52) U.S. Cl.
CPC ............ *Y02T 90/162* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

| | | | |
|---|---|---|---|
| 6,484,094 B1* | 11/2002 | Wako | G01C 21/3617 340/988 |
| 6,487,477 B1 | 11/2002 | Woestman et al. | |
| 6,687,607 B2 | 2/2004 | Graf et al. | |
| 7,679,336 B2 | 3/2010 | Gale et al. | |
| 7,782,021 B2 | 8/2010 | Kelty et al. | |
| 7,849,944 B2 | 12/2010 | DeVault | |
| 7,986,126 B1 | 7/2011 | Bucci et al. | |
| 8,855,842 B2* | 10/2014 | Hayashi | G01C 21/3682 701/123 |
| 2002/0188387 A1 | 12/2002 | Woestman et al. | |
| 2003/0009269 A1 | 1/2003 | Graf et al. | |
| 2008/0262667 A1* | 10/2008 | Otabe | B60W 10/06 701/22 |
| 2009/0082957 A1 | 3/2009 | Agassi et al. | |
| 2009/0114463 A1 | 5/2009 | DeVault | |
| 2009/0259363 A1* | 10/2009 | Li | B60K 6/445 701/36 |
| 2009/0312889 A1 | 12/2009 | Krupadanam et al. | |
| 2009/0313103 A1 | 12/2009 | Ambrosio et al. | |
| 2009/0313104 A1 | 12/2009 | Hafner et al. | |
| 2010/0017249 A1 | 1/2010 | Fincham et al. | |
| 2010/0094496 A1 | 4/2010 | Hershkovitz et al. | |
| 2010/0106401 A1 | 4/2010 | Naito et al. | |
| 2010/0145885 A1* | 6/2010 | Graziano et al. | 705/412 |
| 2010/0161481 A1 | 6/2010 | Littrell | |
| 2010/0179893 A1 | 7/2010 | Burke et al. | |
| 2010/0280675 A1 | 11/2010 | Tate, Jr. et al. | |
| 2011/0071932 A1 | 3/2011 | Agassi et al. | |
| 2011/0130885 A1 | 6/2011 | Bowen et al. | |
| 2011/0202217 A1* | 8/2011 | Kempton | 701/22 |
| 2011/0202418 A1* | 8/2011 | Kempton et al. | 705/26.1 |
| 2012/0179323 A1* | 7/2012 | Profitt-Brown | G01C 21/26 701/29.1 |
| 2012/0203726 A1* | 8/2012 | Klabjan | G06Q 10/06 706/46 |
| 2012/0245750 A1* | 9/2012 | Paul et al. | 700/291 |
| 2013/0090936 A1* | 4/2013 | Solomon | G06Q 50/06 705/1.1 |
| 2013/0179061 A1* | 7/2013 | Gadh | B60L 11/1842 701/123 |
| 2014/0203077 A1* | 7/2014 | Gadh | H02J 7/00 235/382 |
| 2014/0217976 A1* | 8/2014 | McGrath et al. | 320/109 |
| 2015/0039391 A1* | 2/2015 | Hershkovitz | G06Q 10/04 705/7.31 |

FOREIGN PATENT DOCUMENTS

| | | |
|---|---|---|
| CA | 2 385 952 | 11/2002 |
| CA | 2 730 372 | 3/2010 |
| CN | 101769746 | 7/2010 |
| CN | 101952137 | 1/2011 |
| DE | 10 2008 010 558 | 9/2009 |
| DE | 10 2008 053 141 | 4/2010 |
| DK | 201000114 | 7/2010 |
| DK | 201000143 | 10/2010 |
| DK | 201000194 | 3/2011 |
| EP | 1 256 476 | 11/2002 |
| EP | 1 270 303 | 1/2003 |
| EP | 2 181 884 | 5/2010 |
| EP | 2 195 184 | 6/2010 |
| JP | 8-240435 | 9/1996 |
| JP | 3-2641232 | 3/2002 |
| JP | 2003-047110 | 2/2003 |
| JP | 2010-107203 | 5/2010 |
| JP | 2010-540907 | 12/2010 |
| JP | 4-637443 | 2/2011 |
| WO | 2009/039454 | 3/2009 |
| WO | 2009/103369 | 8/2009 |
| WO | 2010/005689 | 1/2010 |
| WO | 2010/033517 | 3/2010 |
| WO | 2011/094627 A1 | 8/2011 |

* cited by examiner

METHOD AND CONTROL DEVICE FOR CHARGING A BATTERY OF A VEHICLE

CROSS-REFERENCE TO RELATED APPLICATIONS

The present application claims the benefit of U.S. Provisional Patent Application No. 61/546,195, filed on Oct. 12, 2011, which is expressly incorporated herein in its entirety by reference thereto.

FIELD OF THE INVENTION

The present invention relates to a method for charging a battery of a vehicle, a control device for charging a battery of a vehicle, and a vehicle including the control device.

SUMMARY

According to example embodiments of the present invention, a method for charging a battery of a vehicle is provided. The vehicle includes at least one electric power train, and the battery supplies electrical energy to the electric power train. According to the method, a charging location for charging the battery after at least one next trip of the vehicle is predicted, and the charging location is transmitted to a power grid.

According to example embodiments of the present invention, a method for charging a battery of a vehicle is provided, the vehicle including at least one electric power train, and the battery supplying electrical energy to the electric power train, a current location of the vehicle being determined during charging of the vehicle. Furthermore, it is determined whether the current location is registered as a public charging location or not, and, if the current location is not registered as a public charging location, the current location is registered as a non-public charging location for the vehicle.

According to example embodiments of the present invention, a control device for charging a battery of a vehicle is provided. The vehicle includes at least one electric power train, and the battery supplies electrical energy to the electric power train. The control device includes a processing unit configured to predict a charging location for charging the battery after at least one next trip of the vehicle, and a transmitter configured to transmit the predicted charging location to a power grid.

According to example embodiments of the present invention, a control device for charging a battery of a vehicle is provided, the vehicle including at least one electric power train and the battery supplies electrical energy to the electric power train, the control device including a positioning unit and a processing unit. The positioning unit is configured to determine a current location of the vehicle during charging the vehicle. The processing unit is configured to determine whether the current location is registered as a public charging location or not. If the current location is not registered as a public charging location, the current location is registered as a non-public charging location for the vehicle.

According to example embodiments of the present invention, a vehicle is provided. The vehicle includes at least one electric power train, a battery and a control device. The battery supplies electrical energy to the electric power train. The control device includes a processing unit and a transmitter. The processing unit is configured to predict a charging location for charging the battery after at least one next trip of the vehicle. The transmitter is configured to transmit the predicted charging location to a power grid.

According example embodiments of the present invention, a vehicle is provided, which includes at least one electric power train, a battery, and a control device. The battery is adapted to supply electrical energy to the electric power train. The control device includes a processing unit and a positioning unit. The positioning unit is configured to determine a current location of the vehicle during charging of the vehicle. The processing unit is configured to determine whether the current location is registered as a public charging location. If the current location is not registered as a public charging location, the current location is registered as a non-public charging location for the vehicle.

Although particular features described in the above summary and the following description are described in connection with particular example embodiments, it is to be understood that the features described herein can be combined with each other unless it is specifically noted otherwise.

Further features and aspects of example embodiments of the present invention are described in more detail below with reference to the appended Figures.

DETAILED DESCRIPTION

Figure 1A:
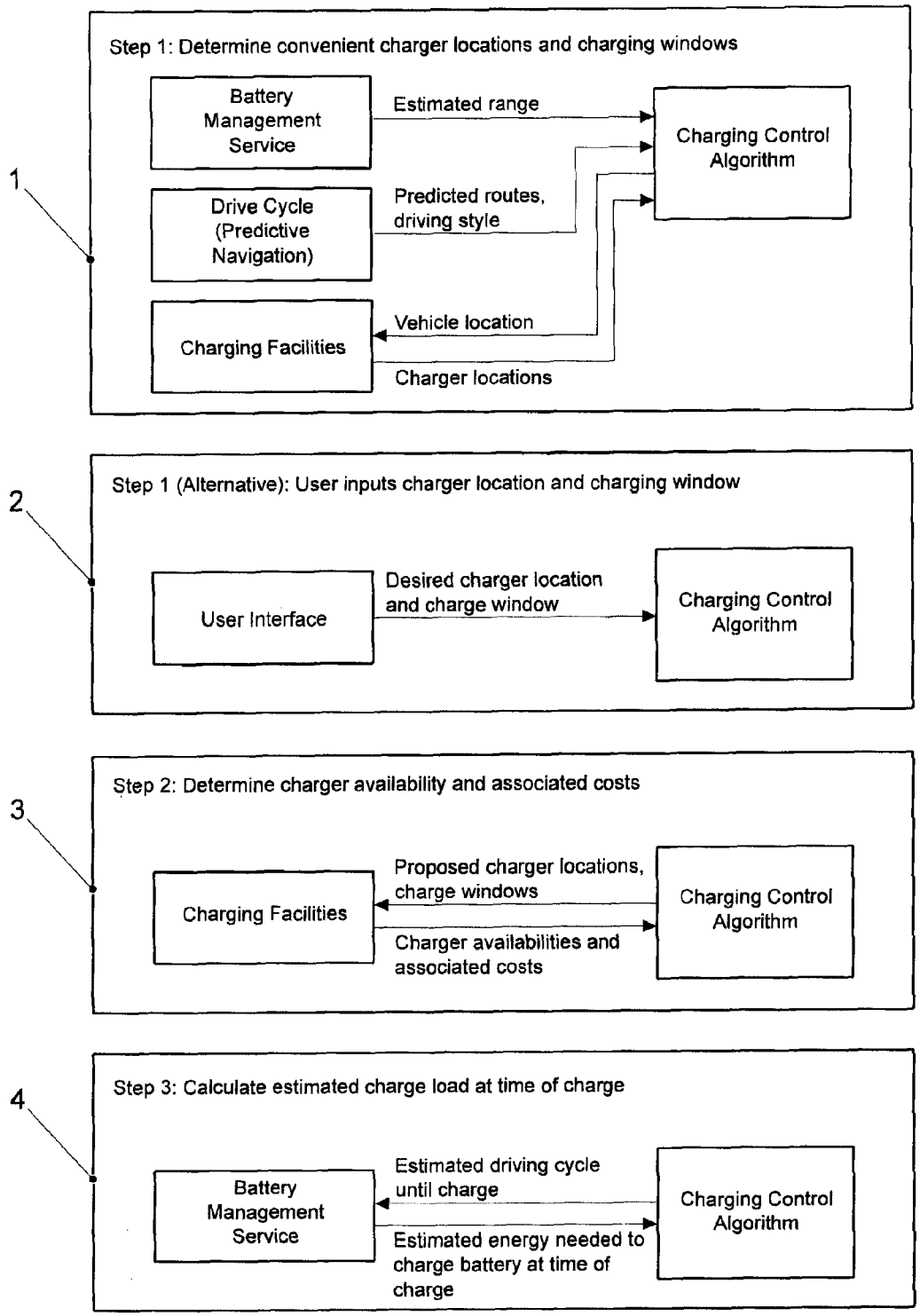
FIG. 1 illustrates a flowchart of a method for charging a battery of a vehicle according to an example embodiment of the present invention.

In the following description, exemplary embodiments of the present invention are described in more detail. It should be understood that the following description is given only for the purpose of illustration of the principles hereof and is not to be taken in a limiting sense.

It is should be understood that the features of the various exemplary embodiments described herein may be combined with each other unless specifically noted otherwise.

It should further be understood that in the following description of exemplary embodiments any direct connection or coupling between functional blocks, devices, components, or other physical or functional units shown in the Figures or described herein can also be implemented as an indirect connection or coupling. Same reference signs in the various Figures refer to similar or identical components.

According to an example embodiment, a method for charging a battery of a vehicle is provided. The vehicle includes at least one electric power train for driving the vehicle. The battery is adapted to supply electrical energy to the electric power train. Furthermore, the battery may be adapted to receive electrical energy from the electric power train when the electric power train recovers electrical energy from a movement of the vehicle. Furthermore, the vehicle may include a plug-in connector for coupling the battery to a power grid for charging the battery. According to the method, a charging location for charging the battery after at least one next trip of the vehicle is predicted, and the predicated charging location is transmitted to a power grid.

According to example embodiments, not only the charging location is predicted but additionally a required charge amount and/or a required charging time window for charging the battery after the at least one next trip of the vehicle are predicted and the charging location, the required charge amount, and the charging time window are transmitted to the power grid.

According to example embodiments, previous data of previous trips of the vehicle are recorded and provided, and the charging location, the required charge amount, and the charging time window for charging the battery after the at least one next trip of the vehicle are predicted based on the previous data. The previous data may include, for example, a previous charging location of a last trip of the vehicle, a previous driving route, a previous driving style of at least one driver of the vehicle, a previous driving time schedule, etc.

According to example embodiments, the required time window and the charging location are input by a user of the vehicle, for example, via a user interface of the vehicle, and the required charge amount for charging the battery after the at least one next trip of the vehicle is predicted based on the required time window and the charging location received from the user.

Vehicles including at least one electric power train, so-called electric vehicles, become a more commonplace mode of transportation. Hence, the additional load that charging this vehicles will place on the electrical power grid becomes non-trivial. Therefore, according to the above-described example embodiments, it is possible to predict beforehand where these loads will be, how long they will be there, and how much power they will draw. By transmitting this knowledge to the electrical power grid, it is possible to bolster the electrical power grid in preparation. This may reduce operation costs and may also ensure that the electrical power grid will be capable of providing the necessary power to charge the electrical vehicles in a timely manner. By using previous data of previous trips of the vehicle, for example, individual driving cycles of an electric vehicle taking into account the multiple users of a shared vehicle, and monitoring real time driving data, for example, a current charging state of the battery, energy requirements for the vehicle may be predicted paired with predicted vehicle locations through the day or driving cycle. This prediction may then be used to determine an optimized location, time, duration, level of charge, and cost for charging the electric vehicle considering parameters from the electrical power grid.

According to example embodiments, power grid parameters are determined based on the required charge amount, the charging location, and the charging time window. The power grid parameters may include, for example, cost for the required electrical charge, availability of the required electrical charge, availability of a charging station at the charging location, a charging profile for providing the required electrical charge, alternative charging locations, alternative charging time windows, alternative charging profiles, and alternative cost for the electrical charge at an alternative charging location, alternative charging time window, or alternative charging profile, for example. The power grid parameters may be displayed to a user of the vehicle, and the user may select at least a charging location and a charging time window from the power grid parameters. Based on the selected power grid parameters selected by the user, a reservation for charging is transmitted to the power grid.

By using this method, the users of the vehicle or the vehicle itself is able to notify to the electrical power grid or services of the electrical power grid ahead of time an estimate of the electrical load that charging the vehicle will require, a location where this charge will occur, a time window during which this charge may occur, and a desired shape of the charging profile, for example. In return for this charging forecast, the grid services may influence the charging profile in order to optimize the load on the electrical grid and may minimize the cost to the user. Furthermore, as explained above, information gathered about the drivers' route histories and driving styles, the expected battery range, and the cost associated with different charging locations and charging time windows may be used to predict energy requirements for the drivers sharing the vehicle and charging locations that will be most convenient and cost-efficient to the drivers. Since this information is gathered a significant amount of time ahead of the charging event itself, it gives the electrical power grid the time needed to properly prepare the grid for this event.

According to example embodiments, a further method for charging a battery of an electric vehicle is provided. According to the method, a current location of the vehicle is determined while the vehicle is charged. Furthermore, it is determined whether the current location is registered as a public charging location. This may be determined from map information of a navigation system of the vehicle. If the current location is not registered as a public charging location, the current location is registered as a non-public charging location for the vehicle. This information may be used to determine a charging location after a next trip of the vehicle. A non-public charging location may include, for example, an access to the power grid at a home address of the driver of the vehicle or at a working place address of the driver.

According to example embodiments, a control device for charging a battery of an electric vehicle is provided. The electric vehicle includes at least one electric power train, and the battery is adapted to supply the electric power train with electrical energy. The control device includes a processing unit and a transmitter. The processing unit is configured to predict a charging location for charging the battery after at least one next trip of the vehicle, and the transmitter is configured to transmit the predicted charging location to a power grid.

According to example embodiments, the processing unit may further be configured to predict additionally a required charge amount and a charging time window for charging the battery after the at least one next trip of the vehicle. Furthermore, the processing unit may be adapted to transmit additionally the required charge amount and the charging time window to the power grid.

According to example embodiments, the control device includes a previous data unit configured to determine and store previous data of previous trips of the vehicle. The processing unit is adapted to predict the charging location for charging the battery after the at least one next trip of the vehicle based on the previous data stored in the previous data unit. The previous data may include, for example, a previous charging location, a previous driving route, a previous driving style of at least one driver of the vehicle, or a previous driving time schedule, for example.

Furthermore, according to example embodiments, the control device may include a user input unit configured to receive the required time window and the charging location from the user of the vehicle. The processing unit may be configured to predict the required charge amount for charging the battery after the at least one next trip of the vehicle based on the required time window and charging location received from the user.

Furthermore, the control device may include a receiver configured to receive power grid parameters determined by the power grid based on the required charge amount, the charging location, and the charging time window. The power grid parameters may include, for example, a cost for the required electrical charge, an availability of the required electrical charge, an availability of a charging station at the charging location, a charging profile for providing the required electrical charge, an alternative charging location, an alternative charging time window, an alternative charging profile, and an alternative cost for the electrical charge at the alternative charging location, the alternative charging time window or the alternative charging profile.

In addition, the control device may include a display unit and a user input unit. The display unit may be configured to display the power grid parameters to a user of the vehicle, and the input unit may be configured to receive a selection from the user selecting at least a charging location and a charging time window from the power grid parameters. The transmitter may be configured to transmit to the power grid a reservation for charging the vehicle based on the power grid parameters selected by the user.

According to example embodiments, a further control device for charging a battery of an electric vehicle is provided. The control device includes a positioning unit and a processing unit. The positioning unit is configured to determine a current location of the vehicle during charging of the vehicle. The processing unit is configured to determine whether the current location is registered as a public charging location, and, if the current location is not registered as a public charging location, to register the current location as a non-public charging location for the vehicle.

According to example embodiments, a vehicle is provided, which includes at least one electric power train and a battery for supplying electrical energy to the electric power train. The vehicle includes the control device as described above.

The above-described exemplary embodiments will now be described in more detail with reference to the appended Figures.

According to example embodiments of the present invention, a predictive charging service is provided which gathers information about the driving patterns of the drivers who share the vehicle including normal routines, driving styles, etc., and information about the estimated vehicle driving range. The predictive charging service uses this information to predict charging locations and charging time windows that will be convenient to the current driver's normal path. By comparing these convenient charging locations and charging time windows with the estimated cost of charging (factoring in both the energy rate provided by the grid services, any discounts for reserving the charging time window, and any other fees associated with the charging facility) a number of potential scenarios would be presented to the current user. The user would then pick a certain scenario which would reserve the charging facility and also notify the grid services of the expected load, time, and location, etc.

Figure 1B:
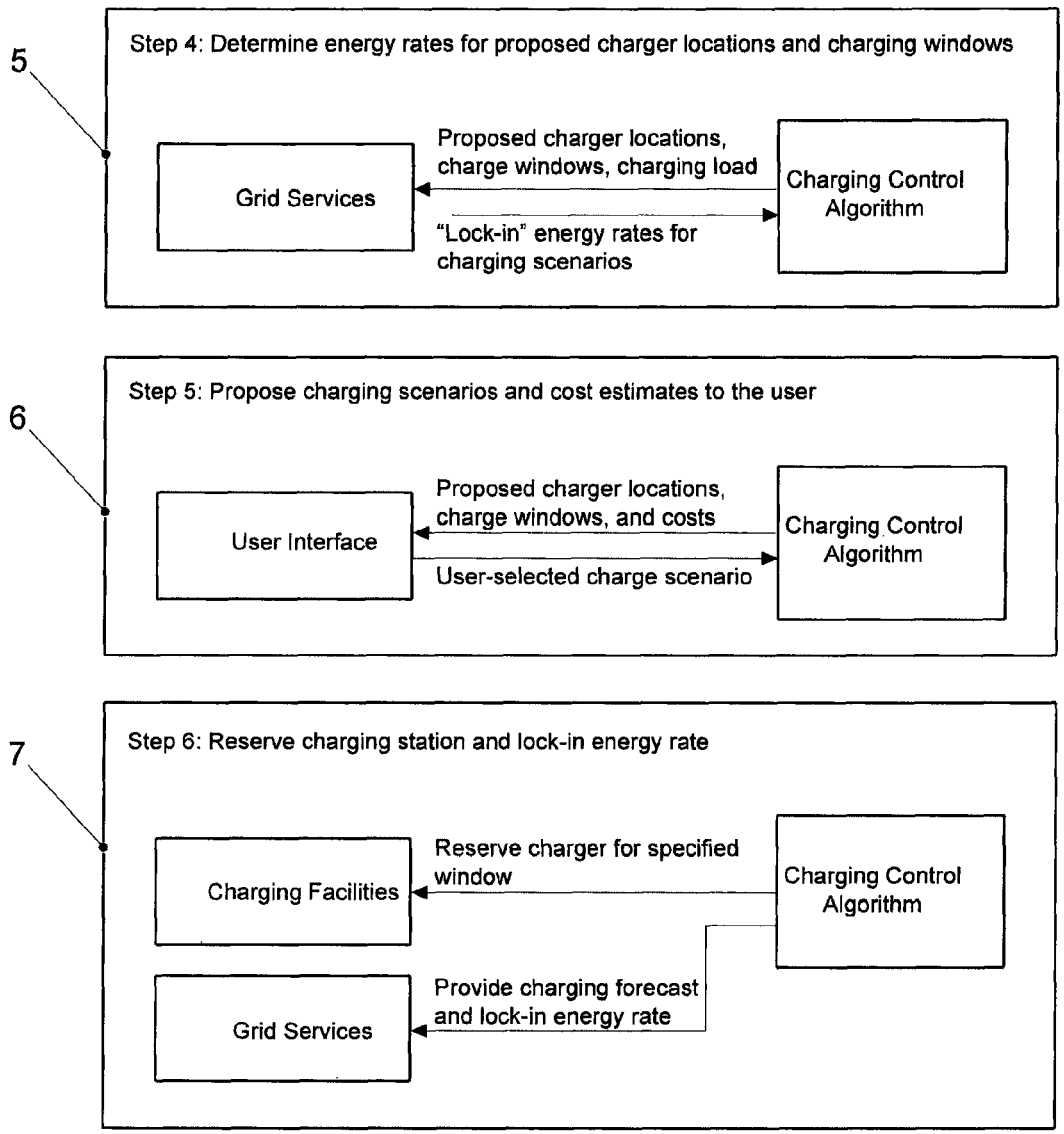

This method is illustrated in FIG. 1. The corresponding steps are described below.

In step 1 as indicated by block 1 in FIG. 1, convenient charging locations and charging time windows are determined. A charging control algorithm collects information from the vehicle concerning an estimated vehicle electric range and predicted routes and destinations based, for example, on a history of driving patterns, driving style, etc. Furthermore, the charging control algorithm requests charger information for its location within a given radius, wherein the given radius may be determined based on the electric range remaining for the vehicle. Then, the charging control algorithm calculates the most convenient charging locations and the times when the driver is expected to be at those charging locations.

Alternatively, as shown in block 2, in step 1 the user may directly input their desired charging location and give the window of time they would expect to have the vehicle at that location available to charge. The charging control algorithm may receive this information from the user via a user interface. Furthermore, the charging control algorithm. may aggregate the above information from both alternatives for multiple users for scenarios in which the vehicle is shared.

In step 2 (block 3) a charger availability and associated costs are determined. The charging control algorithm transmits the information about the convenient charging locations and charging time windows to the charging facilities, for example, to charging facilities of a power grid. The charging facilities may return availability information along with any details associated with the chargers, for example, fees, membership requirements, etc.

In the next step 3 (block 4), an estimated charge load, e.g., a required charge amount, at the time of charge is calculated. Based on the charging locations and the expected drive cycle, the charging control algorithm may determine the estimated distance that will be driven until charging and the type of driving, for example, driving on a freeway or driving around in town, until the charge. This estimate may be given to the battery management device of the vehicle, which in return will give an expected load requirement at the time of charge.

In step 4, which is shown in block 5 of FIG. 1, energy rates for proposed charging locations and charging time windows are determined. The charging control algorithm connects to the power grid services and transmits the possible charge cycles including information about charging time, duration, location, expected load, etc. The power grid services may determine the costs for these charging scenarios and may offer corresponding so-called "lock-in" energy rates. The "lock-in" energy rate describes the energy rate for a given charging scenario if the driver commits to this scenario ahead of time.

In step 5 (block 6), the charging scenarios and the cost estimates are proposed to the user. In this step, the charging control algorithm may propose the charging scenarios to the driver via, for example, a user interface. The different proposed charging scenarios may be optimized for convenience based on an expected driving pattern or on costs based on the "lock-in" energy rate and any charger fees. The user may select a charging scenario from the options presented.

Block 7 shows the last step (step 6) of the method, in which a charging station and a "lock-in" energy rate is reserved. In this step 6, the charging control algorithm may provide power grid services with the charging forecast and may potentially lock-in the discount energy rate with the grid services. Furthermore, the charging control algorithm may provide the charging facilities, for example, the charging station, with the charging forecast and reserve the charging facility for the charging time window.

It may be desirable to offer a service where the driver is notified when they are reaching their selected charging location or are nearing the charging time window. This notification could include the car presenting a reminder to the user on a display of the vehicle. Alternatively, the vehicle could use a wireless network provider to transmit a message to a user's phone.

Furthermore, the power grid may propose in step 4 (block 5) to skew or shift the charging time window to minimize power grid load. For example, suppose the driver selects a charging time window of 12 hours starting at 6 p.m. The cheapest option which generally correlates to the least demand on the electrical power grid may be to maximize charge time and minimize the power draw across those 12 hours. On the other hand, it may be cheaper to delay the start of the charging until after 10 p.m. and charge the battery faster over the remaining eight hours. The power grid service could propose both options to the user with the associated prices.

Alternatively, the power grid service could adjust the charging rate within the given time window, so long as the end result at the end of the time window is the same, e.g., the battery is fully charged or the battery is sufficiently charged for the user's driving needs. For example, the grid may request that the vehicle charges at a lower speed for the first part of the time window and then speeds up for the second part. Furthermore, the grid may be allowed to pull energy out of the battery at the beginning of the time window, for example, during peak hours, and then return the power and any additional power requested to charge the battery by the end of the charging time window. This may keep the electrical power grid balanced and could allow the user to "sell" the energy from the battery to the power grid at a higher price and then "buy" the energy needed at a lower price during off-peak hours.

When a charging station finder engine of the vehicle, for example, a charging station finder embedded in a navigation system, searches for available charging stations in the area within a range of the current charge of the electric vehicle, it will not find "non-public" stations such as the user's home, workplace, a friend's house, etc. These "non-public" charging stations are not listed or registered in a data base of the charging station finder engine and are usually only known and accessible by the driver. Nevertheless, the vehicle's infotainment or navigation system may be adapted to identify the geographical location of those charging points where the vehicle is plugged in for battery charging and may update a local list of available charging stations accordingly. Depending on how frequently the driver approaches each of those "nonpublic" discovered charging stations, the list can be updated to show the driver those charging stations as available charging stations.

Figure 2:
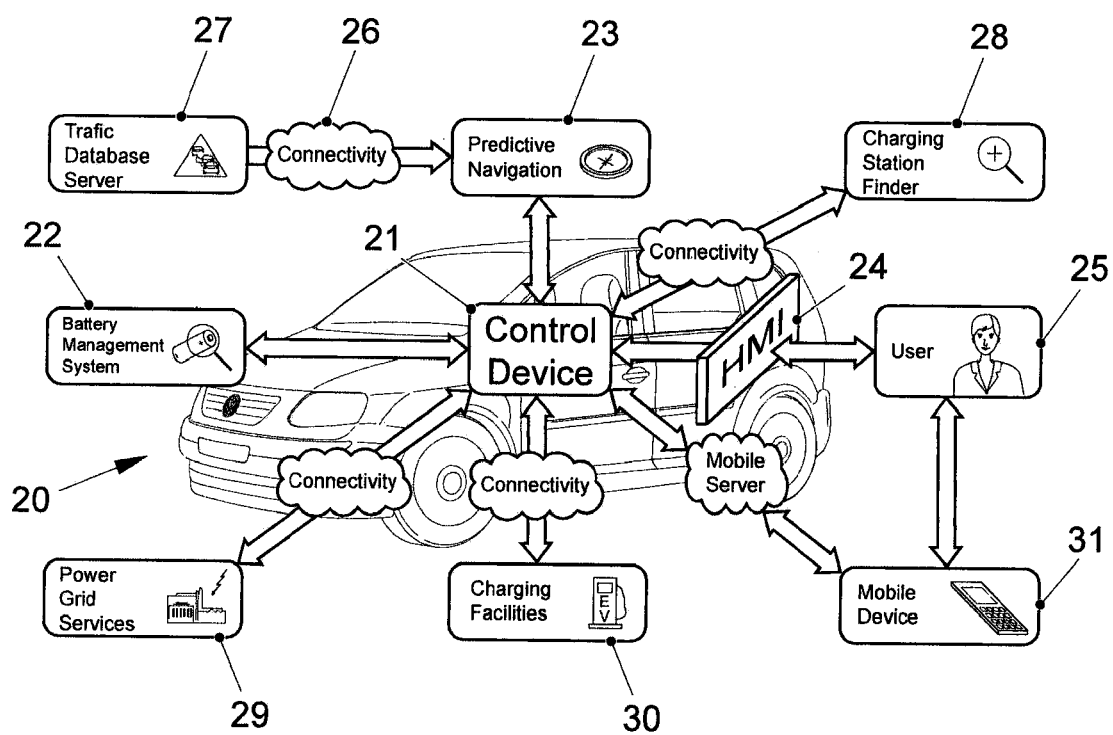
FIG. 2 schematically illustrates a vehicle and involved subsystems according to an example embodiment of the present invention.

FIG. 2 shows a vehicle 20 and involved subsystems for performing the method described in connection with FIG. 1. The vehicle 20 may include a control device 21 for performing the above-described charging control algorithm. Furthermore, the vehicle 20 may include a battery management system 22 for monitoring the electric power train battery of the vehicle 20, a navigation system 23 providing a predictive navigation of the vehicle 20, and a user interface 24, a so-called human-machine interface (HMI), for outputting information to a user 25 of the vehicle 20 and for receiving information from the user 25. The navigation system 23 may be connected via a wireless communication 26 to a traffic database server 27 for receiving information about a current traffic situation on a planned route or within a predefined range around the vehicle 20. The control device 21 may be coupled to a charging station finder 28 which may be located remotely, for example, accessible via a radio frequency connection, or which may reside in a database within the vehicle 20, for example, within the navigation device 23. Furthermore, the control device 21 may include a transceiver for communicating with power grid services 29 and charging facilities 30 for performing the charging control algorithm described in connection with FIG. 1. Furthermore, the control device 21 may include a transceiver for communicating with a mobile device 31 of the user 25, for example, for transmitting messages to the user as described above.

While exemplary embodiments have been described above, various modifications may be implemented in other example embodiments. For example, the battery management system 22 may be a separate system within the vehicle 20 or may be an integrated part of the control device 21. Furthermore, the connectivity between the control device 21 and the power grid services 29 and the charging facilities 30 may be accomplished by any wireless communication service, for example, a UMTS, GPRS or WLAN system, or may be accomplished by a radio frequency communication between the vehicle 20 and transceivers of a traffic management system arranged along roads the vehicle 20 is driving on.

What is claimed is:

1. A method for charging a battery of a vehicle including at least one electric power train, the battery adapted to supply electrical energy to the electric power train, comprising:
   predicting, by a processing unit within the vehicle, an existing charging location for charging the battery after at least one next trip of the vehicle, wherein the predicted existing charging location is based, at least in part, on traffic data and load on a power grid;
   transmitting, by a transmitter, the predicted existing charging location to the power grid;
   receiving, at the processing unit, a plurality of energy rates from the power grid based on the transmitted predicted existing charging location;
   reserving, with the processing unit, the predicted existing charging location at a desired energy rate;
   coupling the battery, by a plug-in connector, to the power grid at the predicted existing charging location; and
   providing power to charge the battery by the plug-in connector at the reserved desired energy rate.

2. The method according to claim 1, wherein the predicting of the charging location includes predicting a required charge amount and/or a charging time window for charging the battery after the at least one next trip of the vehicle, and wherein the transmitting of the charging location includes transmitting the required charge amount and/or the charging time window to the power grid.

3. The method according to claim 2, wherein the predicting of the required charge amount, the charging location, and the charging time window includes:
   receiving the required time window and the charging location from a user of the vehicle; and
   predicting the required charge amount for charging the battery after the at least one next trip of the vehicle based on the received required time window and the charging location.

4. The method according to claim 2, further comprising determining power grid parameters based on the required charge amount, the charging location, and the charging time window.

5. The method according to claim 4, wherein the power grid parameters includes cost for the required electrical charge, availability of the required electrical charge, availability of a charging station at the charging location, a charging profile for providing the required electrical charge, an alternative charging location, an alternative charging time window, an alternative charging profile, and/or an alternative cost for the electrical charge at the alternative charging location, alternative charging time window, and/or alternative charging profile.

6. The method according to claim 4, further comprising:
displaying the power grid parameters to a user of the vehicle;
selecting at least a charging location and a charging time window from the power grid parameters; and
transmitting a reservation for charging to the power grid based on the selected power grid parameters.

7. The method according to claim 6, wherein the selecting is performed by a user of the vehicle.

8. The method according to claim 1, wherein the predicting of the charging location includes:
providing previous data of previous trips of the vehicle; and
predicting the charging location for charging the battery after the at least one next trip of the vehicle based on the previous data.

9. The method according to claim 8, wherein the previous data includes data of a former charging location, a former driving route, a former driving style of at least one driver of the vehicle, and/or a former driving time schedule.

10. The method according to claim 1, wherein the traffic data includes current traffic data of a planned route of the vehicle and/or within a predefined range around the vehicle.

11. The method according to claim 1, wherein the traffic data is obtained from a traffic database server which is connected via a wireless communication to a navigation system of the vehicle.

12. The method according to claim 1, further comprising charging the vehicle according to a charging profile, the charging rate varying over time based on the load on the power grid.

13. A control device for charging a battery of a vehicle including at least one electric power train, the battery adapted to supply electrical energy to the electric power train, comprising:
a processing unit of the vehicle adapted to predict an existing charging location for charging the battery after at least one next trip of the vehicle, wherein the predicted existing charging location is based, at least in part, on traffic data and load on a power grid;
a transmitter adapted to transmit the predicted existing charging location to the power grid; and
a plug-in connector adapted to couple the battery to the power grid at the predicted existing charging location, and adapted to provide power to charge the battery, wherein:
the processing unit is further configured to (i) receive a plurality of energy rates from the power grid based on the transmitted predicted existing charging location and (ii) reserve the predicted existing charging location at a desired energy rate, and
the power to charge the battery is provided at the reserved desired energy rate.

14. The control device according to claim 13, wherein the processing unit is adapted to predict a required charge amount and/or a charging time window for charging the battery after the at least one next trip of the vehicle, and the transmitter is adapted to transmit the required charge amount and/or the charging time window to the power grid.

15. The control device according to claim 14, further comprising a user input unit adapted to receive the required time window and the charging location from a user of the vehicle, the processing unit adapted to predict the required charge amount for charging the battery after the at least one next trip of the vehicle based on the received required time window and charging location.

16. The control device according to claim 14, further comprising a receiver adapted to receive power grid parameters determined by the power grid based on the required charge amount, the charging location, and the charging time window.

17. The control device according to claim 16, wherein the power grid parameters include cost for the required electrical charge, availability of the required electrical charge, availability of a charging station at the charging location, a charging profile for providing the required electrical charge, an alternative charging location, an alternative charging time window, an alternative charging profile, and/or an alternative cost for the electrical charge at the alternative charging location, the alternative charging time window, and/or the alternative charging profile.

18. The control device according to claim 16, further comprising:
a display unit adapted to display the power grid parameters to a user of the vehicle; and
an user input unit adapted to receive from the user a selection of at least a charging location and a charging time window from the power grid parameters;
wherein the transmitter is adapted to transmit a reservation for charging to the power grid based on the selected power grid parameters.

19. The control device according to claim 13, further comprising a previous data unit adapted to determine and store previous data of previous trips of the vehicle, the processing unit adapted to predict the charging location for charging the battery after the at least one next trip of the vehicle based on the previous data from the previous data unit.

20. The control device according to claim 19, wherein the previous data includes data relating to a former charging location, a former driving route, a former driving style of at least one driver, and/or a former driving time schedule.

* * * * *